US011132051B2

(12) United States Patent
Sumner et al.

(10) Patent No.: US 11,132,051 B2
(45) Date of Patent: Sep. 28, 2021

(54) SYSTEMS AND METHODS TO PROVIDE AN INTERACTIVE ENVIRONMENT IN RESPONSE TO TOUCH-BASED INPUTS

(71) Applicants: Disney Enterprises, Inc., Burbank, CA (US); ETH Zürich (Eidgenössische Technische Hochschule Zürich), Zürich (CH)

(72) Inventors: Robert Sumner, Zürich (CH); Benjamin Buergisser, Bellikon (CH); Fabio Zünd, Zürich (CH); Gergely Vakulya, Veszprém (HU); Virag Varga, Zürich (CH); Thomas Gross, Zürich (CH); Alanson Sample, Ann Arbor, MI (US)

(73) Assignees: Disney Enterprises, Inc., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 4 days.

(21) Appl. No.: 16/506,438

(22) Filed: Jul. 9, 2019

(65) Prior Publication Data
US 2021/0011542 A1 Jan. 14, 2021

(51) Int. Cl.
*G06F 3/01* (2006.01)
*H04B 1/3827* (2015.01)
(Continued)

(52) U.S. Cl.
CPC .............. *G06F 3/011* (2013.01); *G06F 3/017* (2013.01); *G06F 3/03* (2013.01); *G06T 19/006* (2013.01); *H04B 1/385* (2013.01); *H04B 13/005* (2013.01)

(58) Field of Classification Search
CPC .................. H04B 13/005; H04B 1/385; H04B 2001/3855–3872; G06T 19/006;
(Continued)

(56) References Cited

U.S. PATENT DOCUMENTS 9,352,213 B2 * 5/2016 Yim .................... A63F 3/00643
9,674,883 B2 6/2017 Thörn
(Continued)

FOREIGN PATENT DOCUMENTS

WO 2018175257 9/2018

OTHER PUBLICATIONS

Virag Varga, Gergely Vakulya, Alanson Sample, and Thomas R. Gross. 2017. Enabling Interactive Infrastructure with Body Channel Communication. Proc. ACM Interact. Mob. Wearable Ubiquitous Technol. 1, 4, Article 169 (Dec. 2017), 29 pages. https://doi.org/10.1145/3161180 (Year: 2017).*
(Continued)

*Primary Examiner* — Liang Y Li
(74) *Attorney, Agent, or Firm* — Esplin & Associates, PC

(57) ABSTRACT

This disclosure presents systems and methods to provide an interactive environment in response to touch-based inputs. A first body channel communication device coupled to a user may transmit and/or receive signals configured to be propagated along skin of the user such that the skin of the user comprises a signal transmission path. A second body channel communication device coupled to an interaction entity may be configured to transmit and/or receive signals configured to be propagated along the skin of the user along the signal transmission path. A presentation device may present images of virtual content to the user. Information may be communicated between the first body channel communication device, the second body channel communication device, and the presentation device so that virtual content specific to
(Continued)

the interaction entity may be presented to augment an appearance of the interaction entity.

20 Claims, 5 Drawing Sheets

(51) Int. Cl.
    *G06T 19/00*     (2011.01)
    *G06F 3/03*     (2006.01)
    *H04B 13/00*     (2006.01)

(58) Field of Classification Search
    CPC .. G06F 3/048; G06F 3/011–015; G06F 3/017; G06F 3/03–047
    See application file for complete search history.

(56) References Cited

U.S. PATENT DOCUMENTS

| | | | | |
|---|---|---|---|---|
| 2013/0217495 | A1* | 8/2013 | You | G09B 5/06 463/31 |
| 2014/0002329 | A1* | 1/2014 | Nishimaki | G06K 7/1404 345/8 |
| 2015/0273337 | A1* | 10/2015 | Crowley | A63F 13/73 463/29 |
| 2015/0375327 | A1* | 12/2015 | Becker | G06T 1/00 345/440 |
| 2017/0103582 | A1 | 4/2017 | Novak | |
| 2017/0244496 | A1* | 8/2017 | Geurts | H04L 63/10 |
| 2018/0150997 | A1 | 5/2018 | Austin | |
| 2018/0254018 | A1 | 9/2018 | Cherkashin | |
| 2019/0282891 | A1* | 9/2019 | Buil | A63F 13/235 |

OTHER PUBLICATIONS

Barrie, Peter, Andreas Komninos, and Oleksii Mandrychenko. "A pervasive gesture-driven augmented reality prototype using wireless sensor body area networks." Proceedings of the 6th International Conference on Mobile Technology, Application & Systems. 2009. (Year: 2009).*

Feel Virtual Objects You Touch in Augmented Reality (HoloLens + Electrical Muscle Stimulation); Apr. 15, 2018; [retrieved from the internet on May 29, 2019 https://www.youtube.com/watch?time_continue=252&v=mgGX6p0rA54], 2 pages.

Gierad Laput, et al., EM-Sense: Touch Recognition of Uninstrumented, Electrical and Electromechanical Objects; Nov. 8-11, 2015, 10 pages.

Iamtechy, Thermal Touch from Metaio—A New Augmented Reality Interface for Wearables, Jun. 16, 2014 [retrieved from the internet on May 29, 2019 https://www.youtube.com/watch?v=K2XL0qnu4Z4], 1 page.

* cited by examiner

SYSTEMS AND METHODS TO PROVIDE AN INTERACTIVE ENVIRONMENT IN RESPONSE TO TOUCH-BASED INPUTS

FIELD

This disclosure relates to systems and methods to provide an interactive environment in response to touch-based inputs.

BACKGROUND

Devices and systems are available to provide virtual reality (VR) and/or augmented reality (AR) experiences. In particular, handheld and/or wearable technology may be used. Wearable technology may include head-mounted displays (HMDs). Handheld technology may include mobile computing platforms, such as smart phones and/or tablets.

Body Channel Communication (BCC) technology may provide non-traditional tangible interfaces, where devices embedded with BCC transceivers may communicate data back and forth through touch interaction. BCC embedded devices may transmit and receive electric signals (in the form of electric fields) that couple to a user's body and propagate along the skin. Information may be embedded in the underlying electric signal, making the human body a transmission path in a communication network.

SUMMARY

One aspect of the disclosure relates to a system configured to provide an interactive environment in response to touch-based inputs. An interactive environment may include one or more of a virtual reality environment, an augmented reality environment, and/or other interactive environment. An augmented reality environment may include views of images of virtual content within a virtual environment superimposed over views of a real-world environment. In some implementations, a user may actively view the real-world environment, for example, through a see-through visor. In some implementations, a user may passively view the real-world environment, for example, through a display or screen that presents images of the real-world environment. A virtual reality environment may include views of images of virtual content within a virtual environment. Virtual content may include one or more virtual objects and/or other virtual content. The terms "space" and "environment" in the context of an interactive environment may be used interchangeably herein.

It is noted that one or more implementations of the systems and methods presented herein may be directed to presenting augmented reality content within an augmented reality environment. However, this is for illustrative purpose only and is not to be considered limiting. For example, those skilled in the art may appreciate that the features and/or functions described herein may be implemented within a virtual reality environment and/or other interactive environment without departing from the scope of the present disclosure.

Some augmented reality systems may utilize computer vision algorithms to understand the physical world and/or to capture visual markers. However, computer vision alone may have limitations. For example, AR systems may not fully understand user interactions with the physical world. In particular, vision algorithms may not easily detect physical interaction, such as physical contact, with real-world objects, people, body parts, and/or other entities.

One or more implementations of the system and method presented herein may address one or more of the foregoing problems associated with utilizing physical contact in the real world, like touching an object, to influence augmented reality experiences. The systems and methods presented herein propose instrumenting users and interaction entities with body channel communication devices. An interaction entity may include one or more of a physical object, another user, a physical location, and/or other entities. Body channel communication devices may be used to recognize when a user is touching or holding one or more objects, is present in one or more places, and/or is touching or holding one or more other users. A presentation device may present virtual content based on the recognition of touching and/or holding interaction entities. By way of non-limiting illustration, virtual content may be perceived by a user as being located in the real-world environment and/or the virtual content may augment an appearance of an interaction entity. It is noted that "touching" may be accomplished by physical contact with hands (e.g., tapping and/or touching with a finger), physical contact by stepping on the object, and/or other considerations of touch. Further, it is within the scope of the disclosure that "touching" may be accomplished without actual physical touch, since a BCC device may be configured to communicate information when the skin when the user is within a threshold distance from the device. The threshold distance may be a few centimeters, such as one to five centimeters.

A system configured to provide an interactive environment in response to touch-based input may include one or more of one or more presentation devices, one or more servers, one or more interaction entities, one or more body channel communication devices, and/or other components. Individual ones of the one or more presentation devices may include one or more of one or more physical processors, non-transitory electronic storage, and/or other components.

A presentation device of one or more presentation devices may be configured to generate images of virtual content. A presentation device may be configured to present images of virtual content such that the virtual content may be perceived by a user as being located in a real-world environment.

A first body channel communication device of one or more body channel communication devices may be coupled to a user present in a real-world environment. The first body channel communication device may include one or more of a first set of one or more processors, a first transceiver, a first non-transitory electronic storage, and/or other components. The first non-transitory electronic storage may store user information and/or other information. The first transceiver may be configured to transmit and/or receive signals configured to be propagated along skin of the user such that the skin of the user may comprise a signal transmission path.

A second body channel communication device of the one or more body channel communication devices may be coupled to an interaction entity present in the real-world environment. The second body channel communication device may include one or more of a second set of one or more processor, a second transceiver, a second non-transitory electronic storage, and/or other components. The second transceiver may be configured to transmit and/or receive signals configured to be propagated along the skin of the user along the signal transmission path. The second non-transitory electronic storage may be configured to store entity information. The entity information may specify an identity of the entity and/or other information.

One or more physical processors of a presentation device and/or one or more physical processors of one or more body channel communication devices may be configured by machine-readable instructions. Executing the machine-readable instructions may cause the one or more physical processors to facilitate providing an interactive environment in response to touch-based inputs. The machine-readable instructions may include one or more computer program components. The one or more computer program components may include one or more of one or more communication components, a detection component, a control component, and/or other components.

A detection component of processor(s) of a presentation device may be configured to obtain image information defining images depicting the real-world environment. The image information may be conveyed by output signals generated by an image sensor coupled to the presentation device.

A detection component of processor(s) of a presentation device may be configured to detect, based on image information and/or other information, presence of one or more interaction entities within the real-world environment.

A communication component of processor(s) of the first body channel communication device may be configured to obtain one or more signals generated by the second body channel communication device. The one or more signals may be generated by, and transmitted from, the second body channel communication device in response to physical touch of the interaction entity by the user. By way of non-limiting illustration, a first signal may be obtained at the first body channel communication device in response to a first physical touch of the interaction entity by the user. The first signal may convey the entity information and/or other information.

A communication component of processor(s) of the first body channel communication device may be configured to effectuate communication of the entity information from the first body channel communication device to the presentation device.

A communication component of processor(s) of a presentation device may be configured to obtain content information specific to the identity of the entity. The content information may define virtual content to be presented by the presentation device.

A control component of processor(s) of a presentation device may be configured to control the presentation device to effectuate presentation of virtual content so that the virtual content may be perceived as being located in the real-world environment and/or may augment an appearance of an interaction entity.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
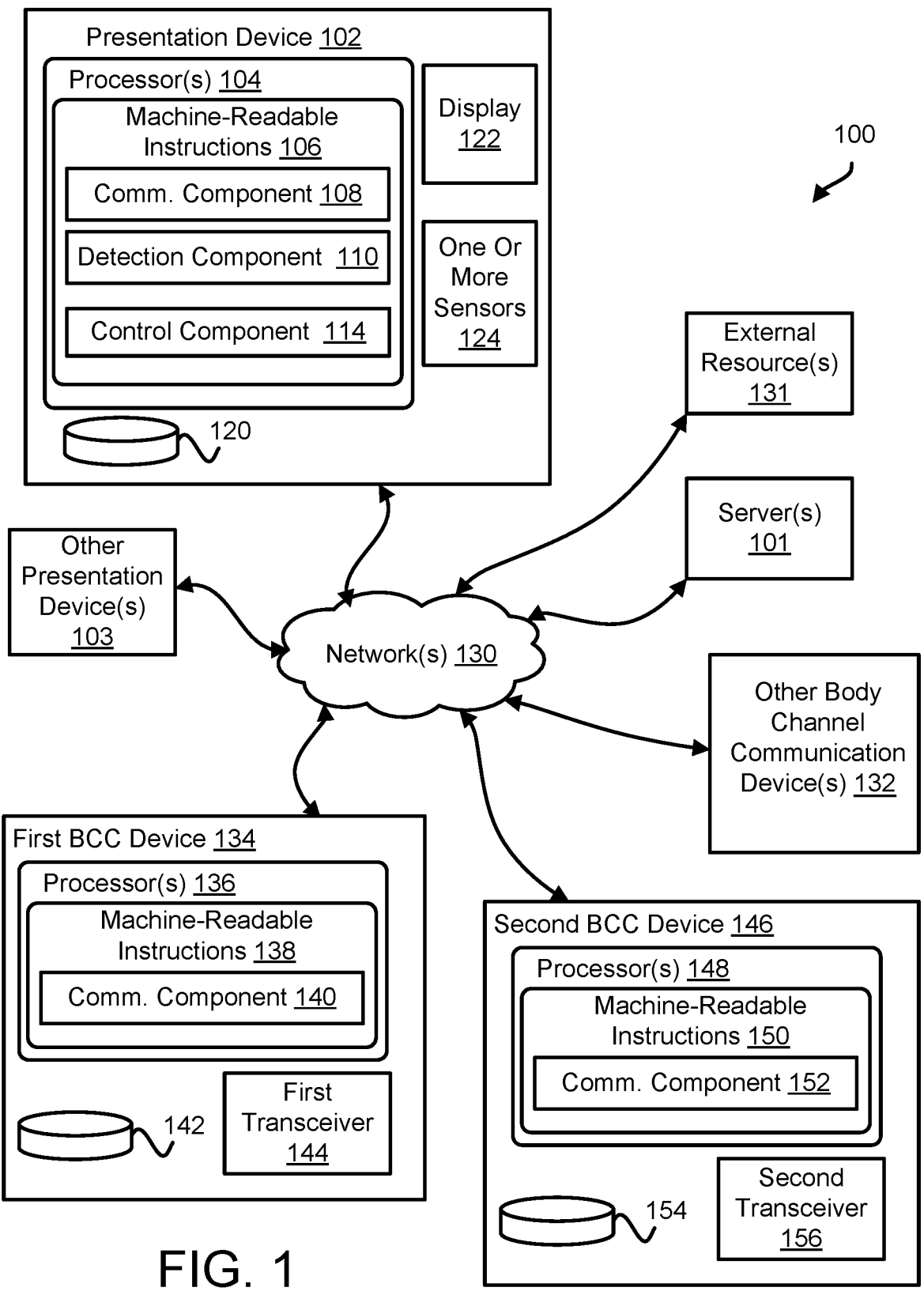
FIG. 1 illustrates a system configured to provide an interactive environment in response to touch-based inputs, in accordance with one or more implementations.

FIG. 1 illustrates a system 100 configured to provide an interactive environment in response to touch-based inputs. An interactive environment may include one or more of a virtual reality environment, an augmented reality environment, and/or other interactive environment. An augmented reality environment may include views of images of virtual content within a virtual environment superimposed over views of a real-world environment. In some implementations, a user may actively view the real-world environment, for example, through a see-through visor. In some implementations, a user may passively view the real-world environment, for example, through a display that presents images of the real-world environment. A virtual reality environment may include views of images of virtual content within a virtual environment. Virtual content may include one or more virtual objects and/or other virtual content. The terms "space" and "environment" in the context of virtual reality and/or augmented reality may be used interchangeably herein.

It is noted that one or more implementations of the systems and methods presented herein may be directed to presenting augmented reality content within an augmented reality environment. However, this is for illustrative purpose only and is not to be considered limiting. For example, those skilled in the art may appreciate that the features and/or functions described herein may be implemented within a virtual reality environment and/or other interactive environment without departing from the scope of the present disclosure.

The system 100 may utilize Body Channel Communication (BCC) devices to facilitate one or more of the detection of touch, transmission and/or reception information, and/or other features and/or functions described herein. BCC embedded devices may transmit and receive electric signals (in the form of electric fields) that couple to a user's body and propagate along the skin. Information may be embedded in the underlying electric signal, making the human body a transmission path in a communication network. BCC can be used for identification and biometrics, object recognition, indoor localization, and/or gaming. BCC has not previously been combined with AR before—most likely due to the lack of a suitable BCC system. However, the system 100 may utilize a ground-less, wearable BCC platform that can be easily integrated into an AR system.

The system 100 may include one or more of a presentation device 102, one or more other presentation devices 103 (e.g., a second presentation device, a third presentation device, . . . nth presentation device), a first body channel communication device 134, a second body channel communication device 146, one or more other body channel communication devices 132, one or more external resources 131, one or more servers 101, and/or other components. While some descriptions herein may be directed to features and/or functions of presentation device 102, it is to be noted that other ones of one or more other presentation devices 103 may be configured similarly as presentation device 102. Further, while some descriptions herein may be directed to features and/or functions of first body channel communication device 134 and/or second body channel communication device 146, it is to be noted that other ones of one or more other body channel communication devices 132 may be configured similarly as first body channel communication device 134 and/or second body channel communication device 146.

The first body channel communication device 134 may be configured to be coupled to a user (not shown) of system 100. When worn, the first body channel communication device 134 may contact the skin of the user. The first body channel communication device 134 may comprise a wearable device. The wearable device may include one or more of an article of clothing, a wristband, a headset, and/or other devices. In some implementations, it is contemplated that first body channel communication device 134 may be integrally coupled to presentation device 102. By way of non-limiting illustration, if the presentation device 102 is a headset, the first body channel communication device 134 may be included as part of the headset in a portion that may contact the user's skin.

The first body channel communication device 134 may include one or more of a first set of one or more processors 136, first non-transitory electronic storage 142, a first BCC transceiver 144, and/or other components. The first non-transitory electronic storage 142 may be configured to store user information and/or other information. The user information may specify an identity of the user. The identity of the user may be specified by one or more of a name, a username, a handle, a serial number, and/or other information. The first BCC transceiver 144 may be configured to transmit and/or receive signals configured to be propagated along skin of the user such that the skin of the user comprises a signal transmission path. The transmitted and/or received signals may convey information.

The first set of one or more processors 136 may be configured to provide information-processing capabilities in first body channel communication device 134. As such, in some implementations, first set of one or more processors 136 may include one or more of a digital processor, an analog processor, a digital circuit designed to process information, an analog circuit designed to process information, a state machine, and/or other mechanisms for electronically processing information.

The first set of one or more processors 136 may be configured by machine-readable instructions 138. Executing the machine-readable instructions 138 may cause the first set of one or more processors 136 to facilitate information communication to and/or from first body channel communication device 134. The machine-readable instructions 138 may include one or more computer program components. The one or more computer program components may include a communication component 140 (abbreviated "Comm. Component 140" in FIG. 1) and/or other components.

The communication component 140 may be configured to generate the BCC signals configured to be propagated along skin of the user (e.g., via first BCC transceiver 144). The BCC signals may convey information, such as the user information and/or other information. The communication component 140 may be configured to generate the BCC signals in response to physical touch, by the user, of another body channel communication device (and/or an interaction entity having the body channel communication device coupled thereto). The communication component 140 may be configured to effectuate transmission of BCC signals along the user's skin, e.g., via first BCC transceiver 144.

The communication component 140 may be configured to obtain BCC signals propagated along skin of the user (e.g., via the second body channel communication device 146 and/or one or more other body channel communication devices 132). The communication component 140 may be configured to derive information carried by BCC signals propagated along the skin of the user.

The second body channel communication device 146 may be configured to be coupled to an interaction entity (not shown). The interaction entity may include one or more of another user, a physical object, and/or other entity. In some implementations, the second body channel communication device 146 may be embedded in and/or otherwise coupled to the interaction entity (e.g., a physical object). In some implementations, "embedded in" may mean "formed integrally with" a physical object. A physical object may include a movable object and/or stationary object. A physical object may include one or more of a toy, a figurine, a piece of furniture, a tool, a mat, a floor tile, a picture frame, a document, and/or other objects.

In some implementations, second body channel communication device 146 may be held and/or otherwise worn by another user. By way of non-limiting illustration, second body channel communication device 146 may be of substantially the same form and/or function as first body channel communication device 134.

The second body channel communication device 146 may include one or more of a second set of one or more processors 148, second non-transitory electronic storage 154, a second BCC transceiver 156, and/or other components. The second non-transitory electronic storage 154 may be configured to store entity information and/or other information. The entity information may include one or more of identity information, content information, state information, interaction history information, and/or information. The identity information may specify an identity of the interaction entity coupled to the second body channel communication device 146. The identity may be specified by one or more of a name, a serial number, and/or other information.

The content information may define virtual content associated with the interaction entity. The content may be associated with the interaction entity insofar that the content may be unique to the interaction entity. In some implementations, content unique to an interaction entity may include content having a form factor that may allow the content to augment an appearance of the interaction entity when presented. By way of non-limiting illustration, virtual content may be presented in a manner that may cause the user to perceive an animation and/or locomotion of an interaction entity. In some implementations, content may be unique to an interaction entity insofar that the content appears to be emitting from the entity. By way of non-limiting illustration, content may include a speech bubble and/or corresponding text.

The state information may specify a current state of the virtual content associated with the interaction entity. By way of non-limiting illustration, an instance of virtual content may be persistent. That is, virtual content may continue to be interacted with by other users and/or one or more change over time whether or not individual users are currently participating in the system. A user that leaves the system, then participates some time later, may find the virtual content has been changed through the interactions of other user and/or other changes that may be determined to occur over time regardless of user interaction.

The interaction history information for an interaction entity may specify prior interactions with virtual content associated with the interaction entity by or one or more other users. The interaction history information may cause the virtual content to change as users continue to interact with the virtual content. The interaction history information may be used to determine the virtual content to be presented to users. By way of non-limiting illustration, during a subsequent interaction by a user with virtual content, the interaction history information may cause the virtual content to refer to a prior interaction by the user with the virtual content.

The second set of one or more processors 148 may be configured to provide information-processing capabilities in second body channel communication device 146. As such, in some implementations, second set of one or more processors 148 may include one or more of a digital processor, an analog processor, a digital circuit designed to process information, an analog circuit designed to process information, a state machine, and/or other mechanisms for electronically processing information.

The second set of one or more processors 148 may be configured by machine-readable instructions 150. Executing the machine-readable instructions 150 may cause the second set of one or more processors 148 to facilitate information communication to and/or from second body channel communication device 146. The machine-readable instructions 150 may include one or more computer program components. The one or more computer program components may include a communication component 152 (abbreviated "Comm. Component 152" in FIG. 1) and/or other components.

The communication component 152 may be configured to generate the BCC signals configured to be propagated along skin of the user. The communication component 152 may be configured to generate the BCC signals in response to physical touch, by one or more users, of the second body channel communication device 146 and/or the interaction entity coupled to the second body channel communication device 146. The BCC signals generated by communication component 152 may convey information, such as the entity information and/or other information. The communication component 152 may be configured to effectuate transmission of the BCC signals along a user's skin, e.g., via second BCC transceiver 156.

The communication component 152 may be configured to obtain BCC signals propagated along skin of the user and received by second BCC transceiver 156. The communication component 152 may be configured to derive information carried by BCC signals propagated along the skin of the user.

The individual body channel communication devices may further include one or more sensors (not shown). The one or more sensors may include an orientation sensor and/or other sensors. An orientation sensor may be configured to generate output signals conveying orientation information and/or other information. Orientation information derived from output signals of an orientation sensor may define an orientation of an individual body channel communication device. In some implementations, orientation of an individual body channel communication device may refer to one or more of a pitch angle, a roll angle, a yaw angle, a heading, a pointing direction, a bearing, and/or other measurements. An orientation sensor may include an inertial measurement unit (IMU) such as one or more of an accelerometer, a gyroscope, a magnetometer, inclinometers, and/or other devices.

In some implementations, individual transceivers of the individual body channel communication devices may be configured to facilitate wireless communication. The transceivers configured to facilitate wireless communication may include the same transceivers configured to transmit and/or receiver BCC signals along a user's body, and/or may include separate devices.

The presentation device 102 may include one or more of one or more physical processors 104, non-transitory electronic storage 120, a display 122, one or more sensors 124, and/or other components.

The one or more physical processors 104 may be configured to provide information-processing capabilities in presentation device 102. As such, in some implementations, processor(s) 104 may include one or more of a digital processor, an analog processor, a digital circuit designed to process information, an analog circuit designed to process information, a state machine, and/or other mechanisms for electronically processing information.

In some implementations, one or more physical processors 104 may be configured to provide remote hosting of features and/or functions of machine-readable instructions 106 to presentation device 102. In some implementations, one or more physical processors 104 may be remotely located from presentation device 102. The one or more physical processors 104 may communicate with presentation device 102, via client/server architecture, and/or other communication schemes. By way of non-limiting illustration, one or more physical processors 104 may comprise one or more computing platforms. In some implementations, one or more physical processors 104 may comprise processor(s) within one or more servers 101. As such features and/or functions of one or more physical processors 104 may be attributed to one or more servers 101 and served to presentation device 102 and/or other presentation devices via client/server architecture.

In some implementations, one or more physical processors 104 may be configured to provide local hosting of features and/or functions of machine-readable instructions 106 to presentation device 102. In some implementations, one or more physical processors 104 may be included with and/or coupled to presentation device 102. The one or more physical processors 104 may communicate with presentation device 102 via local wired and/or wireless connections (e.g., USB, BLE and/or other connections), and/or other communication schemes.

In some implementations, one or more physical processors 104 may be removably coupled to presentation device 102. By way of non-limiting illustration, one or more physical processors 104 may be included in a mobile computing platform (not shown in FIG. 1). The mobile computing platform may include one or more of a cellular telephone, a smartphone, a laptop, a tablet computer, an AR/VR platform, and/or other computing platform. The mobile computing platform may be removably attachable to presentation device 102.

In some implementations, presentation device 102 may itself comprise a mobile computing platform. The mobile computing platform may include one or more of a cellular telephone, a smartphone, a laptop, a tablet computer, and/or other computing platform. Such an implementation may provide an augmented reality environment with passive views of the real world.

The display 122 may be configured to present virtual content, views of the real world, and/or other content. Virtual content may be in the form of images, sequences of images forming video, text, and/or other content. Views of the real world may be in the form of images. Presentation of content via display 122 of presentation device 102 may be facilitated by control signals communicated to display 122 (see, e.g., control component 114). The display 122 may include one or more of a screen, a set of screens, a touchscreen, a monitor, and/or other displays.

In some implementations, display 122 may be configured to present virtual content individually to each eye of a user as stereoscopic pairs. In some implementations, presentation device 102 may comprise, for example, a headset (not shown in FIG. 1). When presentation device 102 is installed on a user's head, the user's gaze may be directed towards presentation device 102 (or at least display 122) to view content presented by and/or on display 122.

In some implementations, display 122 may include one or more of a transparent, semi-transparent, reflective, and/or semi-reflective display component. Images of virtual content may be presented on display 122 such that the user may view the images presented on display 122 as well as the real world through display 122. The virtual content may be perceived as being present in the real world. Such a configuration may provide an interactive space comprising an augmented reality environment with an active view of the real world.

In some implementations, display 122 may comprise a display screen configured to present virtual content. The user may view the display screen such that the display screen may encompass, substantially or entirely, the user's vision without providing views of the real world through the display screen. Such a configuration may provide an interactive space comprising a virtual reality environment.

Individual sensors of one or more sensors 124 may be configured to generate output signals. In some implementations, an individual sensor may include one or more of an orientation sensor, an image sensor, and/or other sensors.

An orientation sensor may be configured to generate output signals conveying orientation information and/or other information. Orientation information derived from output signals of an orientation sensor may define an orientation of presentation device 102. In some implementations, orientation of presentation device 102 may refer to one or more of a pitch angle, a roll angle, a yaw angle, a heading, a pointing direction, a bearing, and/or other measurements. An orientation sensor may include an inertial measurement unit (IMU) such as one or more of an accelerometer, a gyroscope, a magnetometer, inclinometers, and/or other devices.

In some implementations, an image sensor may be configured to generate output signals conveying image information. Image information may define images of the real world. Image information may specify visual content within a field of view of the image sensor. The visual content may include real-world objects and/or surfaces present in the real world. The image information may specify visual content in the form of pixels in an image. Pixels may be defined by one or more of location (e.g., two-dimensional coordinates), color, transparency, and/or other information. In some implementations, an image sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other image sensors.

The images of the real world may be used to detect presence of interaction entities in a real-world environment. Detection of presence may be performed using one or more image-processing techniques. One or more image processing techniques may include one or more of bundle adjustment, speeded up robust features (SURF), scale-invariant feature transform (SIFT), computer vision, and/or other techniques. In some implementations, an interaction entity may include an augmented reality marker disposed thereon. In some implementations, the detection of the presence of the entity within the real-world environment may be facilitated by a detection, based on image information, of presence of the augmented reality marker within the real-world environment. In some implementations, an augmented reality marker may include one or more of an image, a glyph, word, a shape, a design, a color, and/or other marker.

The one or more physical processors 104 may be configured by machine-readable instructions 106. Executing machine-readable instructions 106 may cause one or more physical processors 104 to facilitate providing an interactive environment in response to touch-based inputs. The machine-readable instructions 106 may include one or more computer program components. The one or more computer program components may include one or more of a communication component 108 (abbreviated "Comm. Component 108" in FIG. 1), a detection component 110, a control component 114, and/or other components.

The detection component 110 may be configured to perform one or more of detect presence of individual interaction entities within a real-world environment, determine and/or track location of the individual interaction entities, and/or other operations. In some implementations, detection component 110 may detect the presence of individual interaction entities within a field of view of an image sensor included in one or more sensors 124. Detection component 110 may obtain output signals generated by the image sensor.

Detection component 110 may detect the presence of individual interaction entities based on image information conveyed by the output signals, and/or other information. The image information may define visual content depicting one or more of the interaction entities, individual markers disposed on the interaction entities, and/or other content. In some implementations, location of an individual interaction entity may include one or more of a three-dimensional coordinate of the entity (with respect to a coordinate system origin, for example, at the image sensor), depth information, and/or other information. The depth information may include a range, or depth, of an interaction entity with respect to an image sensor.

In some implementations, detection component 110 may utilize one or more image processing techniques to detect presence of the individual interaction entities and/or their markers, determine locations of the interaction entities and/or their markers within the real-world environment, and/or perform other operations. One or more image processing techniques may include one or more of bundle adjustment, speeded up robust features (SURF), scale-invariant feature transform (SIFT), computer vision, and/or other techniques.

In some implementations, detection component 110 may be configured to determine and/or track location of individual interaction entities based on orientation information derived from an orientation sensor of a body channel communication device coupled to the individual interaction entities. During physical touch of an interaction entity by a user, an augmented reality marker on the interaction entity may be occluded by the user's hand. This may cause difficulty in tracking location based on image information since images depicting an interaction entity may not clearly depict an augmented reality marker and/or may not depict the augmented reality maker at all. The detection component 110 may be configured to, responsive to detecting presence of an interaction entity and/or an initial location of the interaction entity based on images depicting an augmented reality maker of the interaction entity (e.g., prior to occlusion of the augmented reality by a user's hand), determine changes in the orientation information. The changes in the orientation information may be utilized to determine whether an initially determined location of the interaction has changed, without the need to have an unobstructed view of the augmented reality maker.

By way of non-limiting illustration, detection component 110 of presentation device 102 may be configured to perform one or more of detect presence of the interaction entity (not shown in FIG. 1) coupled to the second body channel communication device 146, determine location of the interaction entity, and/or other perform other operations.

The communication component 108 may be configured to facilitate information communication to and/or from presentation device 102. By way of non-limiting illustration, communication component 108 may facilitate communication with one or more of first body channel communication device 134, second body channel communication device 146, one or more other body channel communication devices 132, one or more other presentation device 103, one or more servers 101, and/or other components and/or entities included in system 100.

In some implementations, communication component 108 may be configured to obtain entity information and/or other information from the first body channel communication device 134. By way of non-limiting illustration, first body channel communication device 134 may obtain one or more signals generated by the second body channel communication device 146 in response to physical touch of the interaction entity (including the second body channel communication device 146) by the user. The one or more signals may include a first signal conveying the entity information. The communication device 140 of the first body channel communication device 134 may be configured to effectuate communication of the entity information and/or other information from the first body channel communication device 134 to the presentation device 102. In some implementations, the communication of entity information and/or other information from the first body channel communication device 134 to the presentation device 102 may comprise wired and/or wireless transmission. In some implementations, the communication of entity information and/or other information from the first body channel communication device 134 to the presentation device 102 may utilize network(s) 130.

The communication component 108 may be configured to, in response to obtaining the entity information from the first body channel communication device 134, obtain content information specific to the identity of the interaction entity and defining virtual content to be presented by the presentation device 102. In some implementations, the entity information may include the content information. In some implementations, the content information may be obtained from a storage location storing the content information. By way of non-limiting illustration, content information may be stored in one or more of storage 120, one or more servers 101, an external resource(s) 131, and/or other storage location. In some implementations, the content information may be retrieved from a storage location (e.g., via a look-up based on the identity of the interaction entity).

In some implementations, the content information may specify virtual content specific to user information of one or more users. The virtual content specific to user information may include customized content. The customized content may include content that may specifically refer to a given user, e.g., includes content that knows the user's name, interaction history, and/or other information.

In some implementations, detection component 110 may be configured to determine occurrence of physical touch of one or more interaction entities by one or more user in response to communication component 108 obtaining entity information. In some implementations, occurrence of physical touch may be determined in a response to reception of entity information by communication component 108. In some implementations, determining occurrence of physical touch may include determining one or more of a single occurrence (e.g., the user tapped and/or briefly touched an interaction entity), continuing occurrence (e.g., the user is holding the interaction entity), touch by more than one user, and/or other considerations.

In some implementations, the operations of communication component 108 may be performed simultaneously with the operations of detection component 110. By way of non-limiting illustration, the detection of presence of an interaction entity via image information may occur simultaneously as the user initiates a physical touch of the interaction entity. In some implementations, the operations of communication component 108 may be performed after, and/or responsive to, the operations of detection component 110. By way of non-limiting illustration, the detection of presence of an interaction entity via image information may occur first before the communications via body channel communication devices.

The control component 114 may be configured to control presentation device 102 (e.g., via display 122) to generate and/or present images of virtual content. The virtual content may be presented such that the user of presentation device 102 may perceive the virtual content as being located in the real-world environment. In some implementations, the virtual content may include content that augments an appearance of the interaction entity. Augmenting an appearance of the interaction entity may include presenting the virtual content such that virtual content occludes at least some of the interaction entity. Augmenting an appearance of the interaction entity may include presenting the virtual content such that virtual content appears to be emitting from the interaction entity.

In some implementations, the control component 114 may be configured to control presentation device 102 to generate and/or present images of virtual content in response to one or more determined occurrences of physical touch. By way of non-limiting illustration, the control component 114 may be configured to control presentation device 102 to generate and/or present images of virtual content in response to a single occurrence. By way of non-limiting illustration, the control component 114 may be configured to control presentation device 102 to generate and/or present images of virtual content in response to continuing occurrence. By way of non-limiting illustration, the control component 114 may be configured to control presentation device 102 to generate and/or present images of virtual content in response to touch by more than one user.

Figure 3:
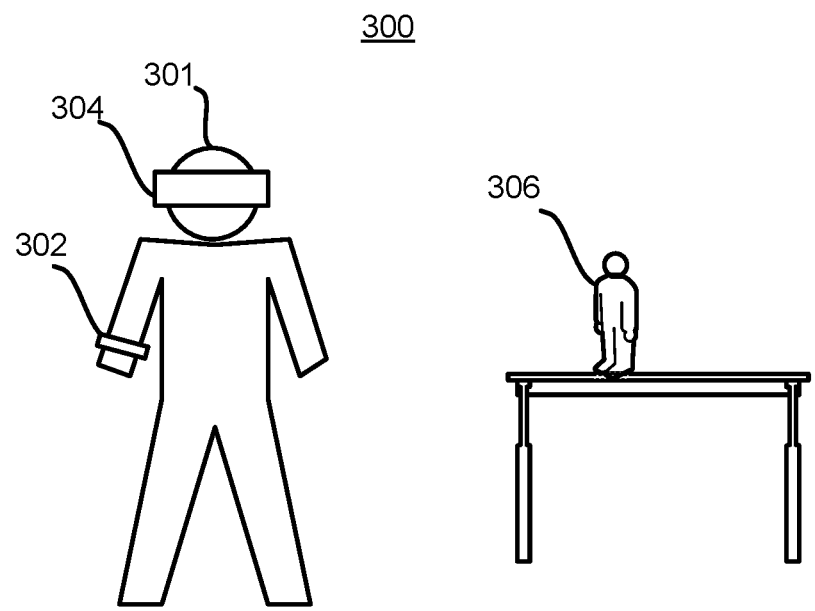
FIG. 3 shows a graphic illustration of an implementation of the system of FIG. 1.

FIGS. 3-7 illustrate various implementations of the system of FIG. 1 configured to provide an interactive environment in response to touch-based inputs. FIG. 3 shows a graphic illustration of an implementation of the system of FIG. 1. FIG. 3 illustrates an interactive environment 300 including one or more of a first user 301, a first body channel communication device 302 worn by the first user 301, a first presentation device 304 worn by the first user 301, a first interaction entity 306, and/or other components. It should be noted that the position of first body channel communication device 302 on the wrist or arm of the first user 301 is for illustration purposes only. In some implementations, the first body channel communication device 302 may be attached to an other body part, e.g., foot, chest, head, etc. The first interaction entity 306 may include one or more of an augmented reality maker (not shown in FIG. 3), a second body channel communication device (not shown in FIG. 3), and/or other components. The first presentation device 304 may be configured to obtain image information defining images depicting the interactive environment 300. The first presentation device 304 may be configured to detect, based on the image information, presence of first interaction entity 306 within the environment.

Figure 4:
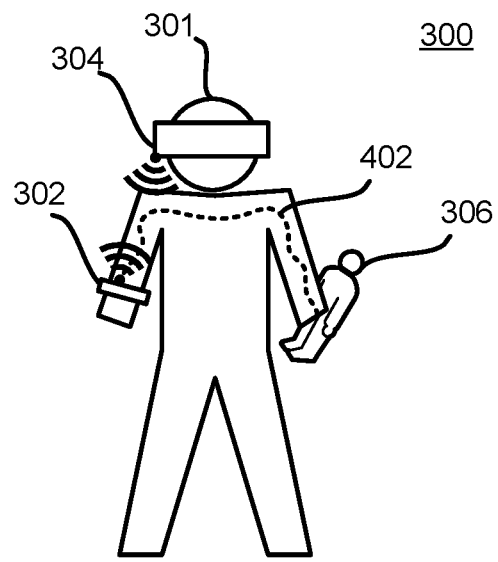
FIG. 4 shows a graphic illustration of an implementation of the system of FIG. 1.

FIG. 4 shows another graphic illustration of an implementation of the system of FIG. 1 where the first user 301 has performed a physical touch of the first interaction entity 306. The first body channel communication device 302 may obtain one or more signals communicated from the second body channel communication device of the first interaction entity 306 along a signal transmission path 402 on the user's skin. The one or more signals may convey entity information associated with the first interaction entity 306. The first body channel communication device 302 may effectuate communication of the entity information from the first body channel communication device 302 to the first presentation device 304. The communication may include wireless and/or wired communication.

Figure 5:
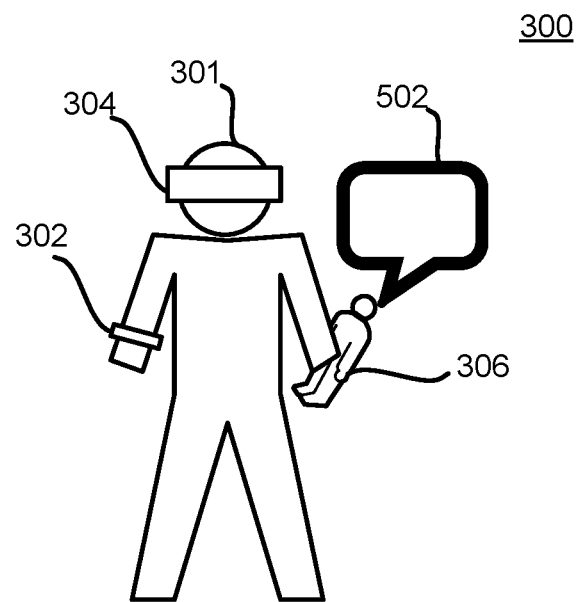
FIG. 5 shows a graphic illustration of an implementation of the system of FIG. 1.

FIG. 5 shows another graphic illustration of an implementation of the system of FIG. 1 showing the presentation of virtual content. The first presentation device 304 may be configured to obtain content information specific to the identity of the first interaction entity 306. The content information may define virtual content 502 to be presented by first presentation device 304. The first presentation device 304 may be configured to effectuate presentation of one or more images of the virtual content 502 so that the virtual content 502 augments an appearance of the first interaction entity 306. By way of non-limiting illustration, the virtual content 502 may include a speech bubble presented so that the first user 301 may perceive the first interaction entity 306 as speaking to them.

Figure 6:
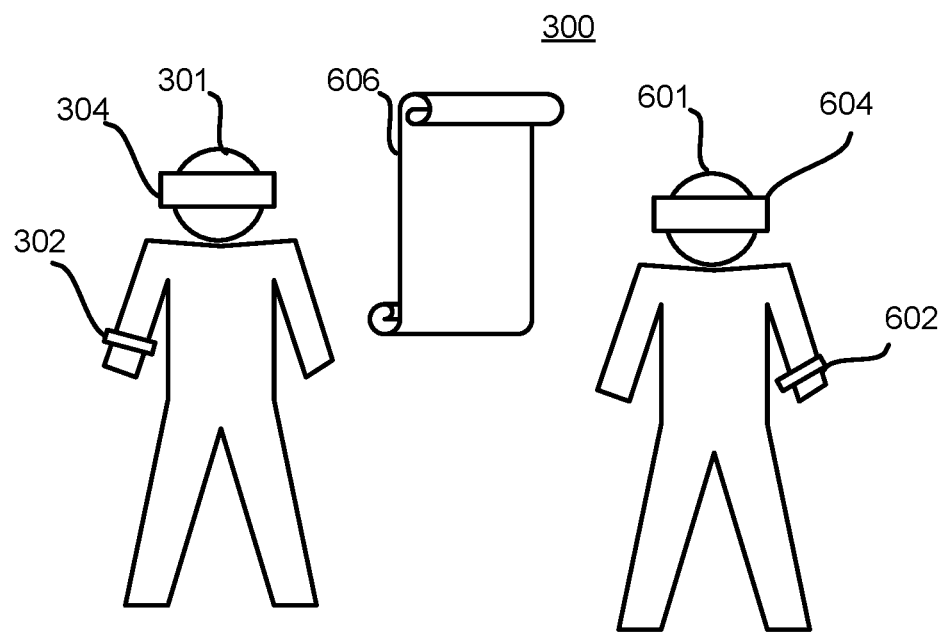
FIG. 6 shows a graphic illustration of an implementation of the system of FIG. 1.

FIG. 6 shows a graphic illustration of an implementation of the system of FIG. 1. FIG. 6 illustrates interactive environment 300 including one or more of the first user 301, the first body channel communication device 302 worn by the first user 301, the first presentation device 304 worn by the first user 301, a second user 601, a second body channel communication device 602 worn by the second user 601, a second presentation device 604 worn by the second user 601, a second interaction entity 606, and/or other components. The second interaction entity 606 may include one or more of an augmented reality maker (not shown in FIG. 6), a third body channel communication device (not shown in FIG. 6), and/or other components. The first presentation device 304 and/or second presentation device 604 may be configured to obtain image information defining images depicting the interactive environment 300. The first presentation device 304 and/or second presentation device 604 may be configured to detect, based on the image information, presence of second interaction entity 606 within the environment.

Figure 7:
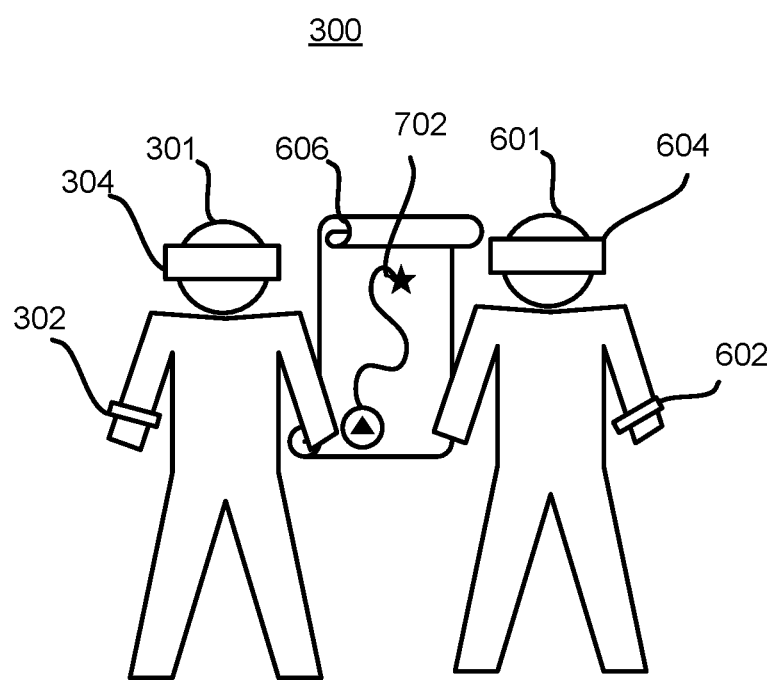
FIG. 7 shows a graphic illustration of an implementation of the system of FIG. 1.

FIG. 7 shows another graphic illustration of an implementation of the system of FIG. 1 where the first user 301 and the second user 601 have performed a concurrent physical touch of the second interaction entity 606. The first body channel communication device 302 may obtain one or more signals communicated from the third body channel communication device of the second interaction entity 606 along a signal transmission path on the first user's skin. The second body channel communication device 602 may obtain one or more signals communicated from the third body channel communication device of the second interaction entity 606 along a signal transmission path on the second user's skin. The one or more signals may convey entity information associated with the second interaction entity 606, and/or other information. In some implementations, the second interaction entity 606 may be configured to extract information from BCC signals coming simultaneously from first body channel communication device 302 and second body channel communication device 602.

The first presentation device 304 and the second presentation device 604 may be configured to effectuate presentation of one or more images of virtual content 702 specific to the second interaction entity 606 so that the virtual content 702 augments an appearance of the second interaction entity 606. By way of non-limiting illustration, the virtual content 702 may include a virtual map revealed on a physical parchment such that the first user 301 and the second user 601 can view the virtual map. In some implementations, concurrent touch by both users may be required to review the virtual content 702 to one or both of the users.

It is noted that although implementations of the systems and methods described herein include both users and interaction entities outfitted with body channel communication devices, this is for illustrative purposes only and not to be considered limiting. In some implementations, a user may not be coupled with a wearable body channel communication device. The user may act as a "bridge" to establish communication between two body channel communication device-enabled interaction entities to drive an augmented reality experience. By way of non-limiting illustration, a user may wear an augmented reality presentation device, but a wearable body channel communication device may not be attached to the user. The user wearing the augmented reality presentation device may physically touch a first body channel communication device-enabled interaction entity and simultaneously (or subsequently) touch a second body channel communication device-enabled interaction entity. The user's skin may become a transmission path to communicate information between the first body channel communication device-enabled interaction entity and the second body channel communication device-enabled interaction entity. This "bridging" may cause one or both of the body channel communication device-enabled interaction entities to communicate with the user's augmented reality presentation device to cause the presentation device to present augmented reality content.

Returning to FIG. 1, external resource(s) 131 may include sources of information, hosts, and/or providers of information outside of system 100, external entities participating with system 100, and/or other resources. In some implementations, some or all of the functionality attributed herein to external resource(s) 131 may be provided by resources included in system 100. By way of non-limiting illustration, an external entity may be configured to provide virtual content information, marker information, and/or other information.

Individual presentation devices may include communication lines or ports to enable the exchange of information with one or more networks 130. The one or more networks 130 may include wired and/or wireless connections. By way of non-limiting illustration, one or more networks 130 may include one or more of the Internet, wireless Bluetooth Low Energy (BLE), Wi-Fi, wired Universal Serial Bus (USB) connection, wired Ethernet, and/or other connections. It will be appreciated that this is not intended to be limiting and that the scope of this disclosure includes implementations in which components of system 100 may be operatively linked via some other communication media.

Illustration of the presentation device 102 in FIG. 1 is not intended to be limiting. The presentation device 102 may include a plurality of hardware, software, and/or firmware components operating together to provide the functionality attributed herein to the presentation devices. For example, presentation device 102 may be implemented by a cloud of computing platforms operating together.

Electronic storage 120 of presentation device 102 may include electronic storage media that electronically stores information. The electronic storage media of electronic storage 120 may include one or both of system storage that is provided integrally (i.e., substantially non-removable) with presentation device 102 and/or removable storage that is removably connectable to presentation device 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from external resource(s) 131, and/or other information that enables system 100 to function as described herein.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, and/or 114. Processor(s) 104 may be configured to execute components 108, 110, and/or 114 by software; hardware; firmware; some combination of software, hardware, and/or firmware; and/or other mechanisms for configuring processing capabilities on processor(s) 104.

It should be appreciated that although components 108, 110, and/or 114 are illustrated in FIG. 1 as being co-located within a single processing unit, in implementations in which processor(s) 104 includes multiple processing units, one or more of components 108, 110, and/or 114 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108, 110, and/or 114 described above is for illustrative purposes and is not intended to be limiting, as any of components 108, 110, and/or 114 may provide more or less functionality than is described. For example, one or more of components 108, 110, and/or 114 may be eliminated, and some or all of its functionality may be provided by other ones of components 108, 110, and/or 114 and/or other components. As another example, processor(s) 104 may be configured to execute one or more additional components that may perform some or all of the functionality attributed to one of components 108, 110, and/or 114.

Figure 2:
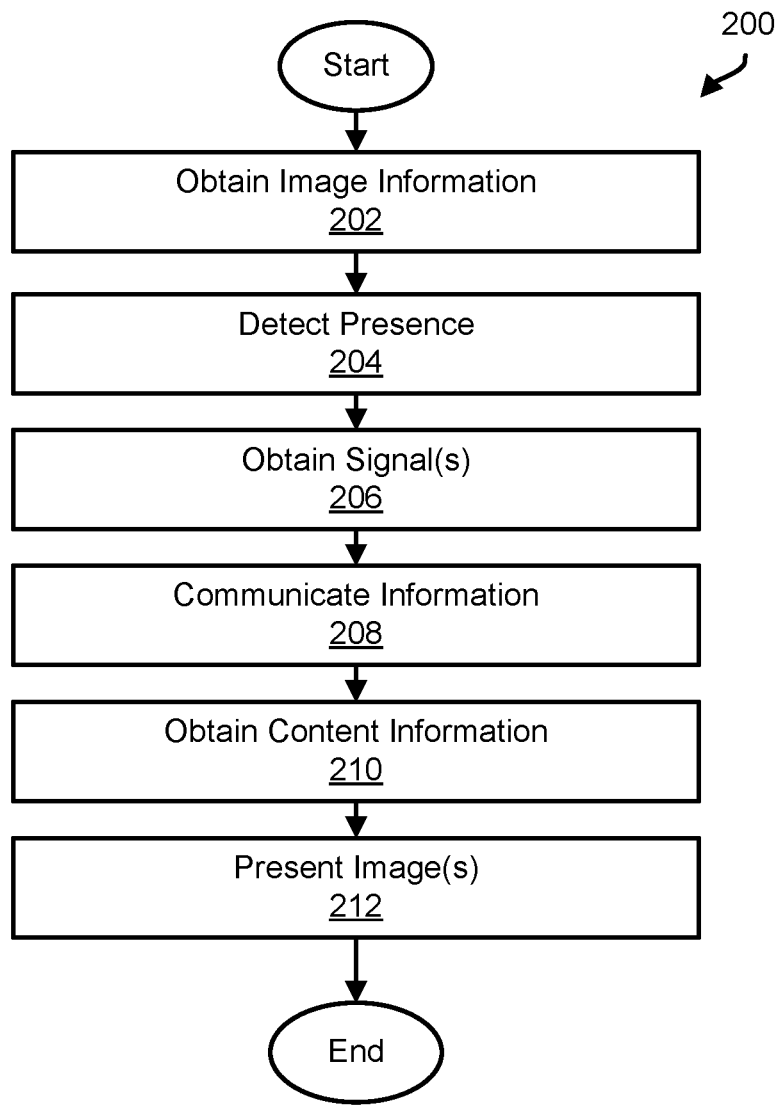
FIG. 2 illustrates a method to provide an interactive environment in response to touch-based inputs, in accordance with one or more implementations.

FIG. 2 illustrates a method 200 to provide an interactive environment in response to touch-based inputs, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more body channel communication devices, one or more presentation devices, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200. By way of non-limiting illustration, method 200 may be implemented by a system such as system 100 (shown in FIG. 1 and described herein).

At an operation 202, image information defining images depicting a real-world environment may be obtained. The image information may be conveyed by output signals generated by an image sensor coupled to a presentation device associated with a user. In some implementations, operation 202 may be performed by one or more physical processors executing a detection component the same as or similar to detection component 110 (shown in FIG. 1 and described herein).

At an operation 204, presence of the entity within the real-world environment may be detected based on the image information and/or other information. In some implementations, operation 204 may be performed by one or more physical processors executing a detection component the same as or similar to detection component 110 (shown in FIG. 1 and described herein).

At an operation 206, one or more signals generated by a second body channel communication device may be obtained at a first body channel communication device in response to physical touch of an interaction entity by the user. By way of non-limiting illustration, a first signal may be obtained at the first body channel communication device in response to a first physical touch of the entity by the user. The first signal may convey entity information. In some implementations, operation 206 may be performed by one or more physical processors executing a communication component the same as or similar to communication component 140 (shown in FIG. 1 and described herein).

At an operation 208, communication may be effectuated of the entity information from the first body channel communication device to the presentation device. In some implementations, operation 208 may be performed by one or more physical processors executing a communication component the same as or similar to communication component 140 (shown in FIG. 1 and described herein).

At an operation 210, content information specific to the identity of the interaction entity may be obtained. The content information may define virtual content to be presented by the presentation device associated with the user. In some implementations, operation 210 may be performed by one or more physical processors executing a communication component the same as or similar to communication component 108 (shown in FIG. 1 and described herein).

At an operation 212, presentation may be effectuated of one or more images of the virtual content so that the virtual content may be perceived as being located in the real-world environment and/or may augment an appearance of the interaction entity. In some implementations, operation 212 may be performed by one or more physical processors executing a control component the same as or similar to control component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide an interactive environment in response to touch-based inputs, the system comprising:
    a first body channel communication device coupled to a first user present in a real-world environment, the first body channel communication device transmitting and receiving signals propagated along a skin of the first user, the skin forming a signal transmission path;
    a second body channel communication device coupled to an entity present in the real-world environment, the second body channel communication device storing entity information and transmitting and receiving the signals propagated along the skin of the first user along the signal transmission path, the entity information specifying an identity of the entity; and
    one or more physical processors configured by machine-readable instructions to:
        obtain image information defining images depicting the real-world environment, the image information being conveyed by output signals generated by an image sensor coupled to a presentation device;
        detect, based on the image information, presence of an augmented reality marker associated with the entity, the augmented reality marker being depicted in the images depicting the real-world environment;
        determine, at the presentation device and based on the presence of the augmented reality marker, an initial location of the entity;
        detect occurrence of a concurrent physical touch of the entity by the first user and a second user based on signals received at the second body channel communication device;
        obtain, at the first body channel communication device, a first signal generated by the second body channel communication device in response to the detection of the concurrent physical touch of the entity by the first user and the second user, the first signal conveying the entity information;
        effectuate communication of the entity information from the first body channel communication device to the presentation device;
        obtain, by the presentation device, content information defining virtual content to be presented by the presentation device;
        during the concurrent physical touch of the entity by the first user and the second user:
            obtain, at the presentation device, changes in orientation information derived from an orientation sensor of the second body channel communication device coupled to the entity; and
            determine, at the presentation device, a current location of the entity based on the changes in the orientation information and the initial location of the entity while the augmented reality marker is no longer depicted in the images depicting the real-world environment due to occlusion of the augmented reality marker; and
        effectuate, by the presentation device, presentation of one or more images of the virtual content based on the current location of the entity such that the virtual content is perceived as being located in the real-world environment and augments an appearance of the entity.

2. The system of claim 1, wherein the entity information further specifies the content information such that the first signal conveys both the identity of the entity and the content information.

3. The system of claim 1, wherein the communication of the entity information from the first body channel communication device to the presentation device is a wireless communication.

4. The system of claim 1, wherein the entity is a physical object.

5. The system of claim 1, wherein occurrence of a physical touch of the entity by the first user is detected based on the entity information being communicated from the first body channel communication device and received at the presentation device.

6. The system of claim 1, wherein the first body channel communication device is a wearable device.

7. The system of claim 1, wherein the entity information further includes state information and interaction history information, the state information specifying a current state of the virtual content, and the interaction history information specifying prior interactions with the virtual content by the first user, one or more other users, or a combination thereof.

8. The system of claim 1, wherein the first body channel communication device comprises a first non-transitory electronic storage configured to store user information, the user information specifying an identity of the first user, and wherein the one or more physical processors are further configured by the machine-readable instructions to determine the content information based on the user information such that the content information is specific to the identity of the entity and the identity of the first user.

9. The system of claim 1, wherein the one or more physical processors are further configured by the machine-readable instructions to:
effectuate, by a second presentation device associated with the second user, presentation of the one or more images of the virtual content concurrently with the presentation of the one or more images of the virtual content by the presentation device.

10. The system of claim 1, wherein the augmented reality marker comprises an image, a glyph, a word, a shape, a design, a color, or a combination thereof.

11. A method to provide an interactive environment in response to touch-based inputs, the method comprising:
obtaining image information defining images depicting a real-world environment, the image information being conveyed by output signals generated by an image sensor coupled to a presentation device;
detecting, based on the image information, presence of an augmented reality marker associated with an entity present in the real-world environment, the augmented reality marker being depicted in the images depicting the real-world environment;
determining, at the presentation device and based on the presence of the augmented reality marker, an initial location of the entity;
detecting occurrence of a concurrent physical touch of the entity by a first user and a second user based on signals received at a second body channel communication device coupled to the entity, the second body channel communication device storing entity information and transmitting and receiving signals propagated along a skin of the first user, the skin forming a signal transmission path, the entity information specifying an identity of the entity;
obtaining, at a first body channel communication device, a first signal propagated along the skin of the first user in response to the detection of the concurrent physical touch of the entity by the first user and the second user, the first signal conveying the entity information, wherein the first body channel communication device is coupled to the first user present in the real-world environment, the first body channel communication device transmitting and receiving the signals propagated along the skin of the first user;
effectuating communication of the entity information from the first body channel communication device to the presentation device;
obtaining, by the presentation device, content information specific to the identity of the entity, the content information defining virtual content to be presented by the presentation device;
during the concurrent physical touch of the entity by the first user and the second user:
obtaining, at the presentation device, changes in orientation information derived from an orientation sensor of the body channel communication device coupled to the entity; and
determining, at the presentation device, a current location of the entity based on the changes in the orientation information and the initial location of the entity while the augmented reality marker is no longer depicted in the images depicting the real-world environment due to occlusion of the augmented reality marker; and
presenting, by the presentation device, one or more images of the virtual content based on the current location of the entity such that the virtual content is perceived as being located in the real-world environment and augments an appearance of the entity.

12. The method of claim 11, wherein the entity information further specifies the content information such that the first signal conveys both the identity of the entity and the content information.

13. The method of claim 11, wherein the communication of the entity information to the presentation device is a wireless communication.

14. The method of claim 11, wherein the entity is a physical object.

15. The method of claim 11, wherein occurrence of a physical touch of the entity by the first user is determined based on the entity information being received at the presentation device.

16. The method of claim 11, wherein the first body channel communication device comprises a wearable device.

17. The method of claim 11, wherein the entity information further includes state information and interaction history information, the state information specifying a current state of the virtual content, and the interaction history information specifying prior interactions with the virtual content by the first user, one or more other users, or a combination thereof.

18. The method of claim 11, further comprising:
storing user information, the user information specifying an identity of the first user; and
determining the content information based on the user information such that the content information is specific to the identity of the entity and the identity of the first user.

19. The method of claim 11, further comprising:
presenting, by a second presentation device associated with the second user, presentation of the one or more images of the virtual content concurrently with the presentation of the one or more images of the virtual content by the presentation device.

20. The method of claim 11, wherein the augmented reality marker comprises an image, a glyph, a word, a shape, a design, a color, or a combination thereof.

* * * * *